May 10, 1949.  W. A. WARTINEN  2,469,672
CALCULATOR
Filed June 1, 1946

INVENTOR
WILLIAM A. WARTINEN
BY
Boyken, Mohler & Beckley
ATTORNEYS

Patented May 10, 1949

2,469,672

UNITED STATES PATENT OFFICE 2,469,672

CALCULATOR

William A. Wartinen, San Francisco, Calif.

Application June 1, 1946, Serial No. 673,806

1 Claim. (Cl. 235—61)

This invention relates to a calculator for use by engravers and letterers in determining the length required for a predetermined number of letters, spaces, etc., as they may occur in one or more words.

The letters to be engraved or produced are for the most part standardized as to height from center line to center line, and also as to width. Spaces and the spaces required for commas or periods are also relatively well standardized for each size of letter. The letters "I," spaces, and periods each requires about the same width for any given height of letter, while the letters "W" and "M" have similar widths that are different from the other letters in the alphabet. Heretofore in engraving or lettering, the operators have generally relied more or less on guesswork in determining the length of a word or words, and thus the positioning of the words is either incorrect in many instances, or else the operator has squeezed or stretched certain letters or spaces so as to make the words end at approximately the right places. Naturally the character of the work suffers in either case.

The principal object of the present invention is the provision of a simple, easily manipulatable calculator to enable the operator to calculate in advance with accuracy the space that will be required for a word or words to be engraved or printed. This calculator is adapted to give the correct answer in terms of standard linear measure that will be required for words, phrases, etc. to be engraved or printed in standard height letters.

Other objects and advantages will appear in the description and drawings.

Figure 1:
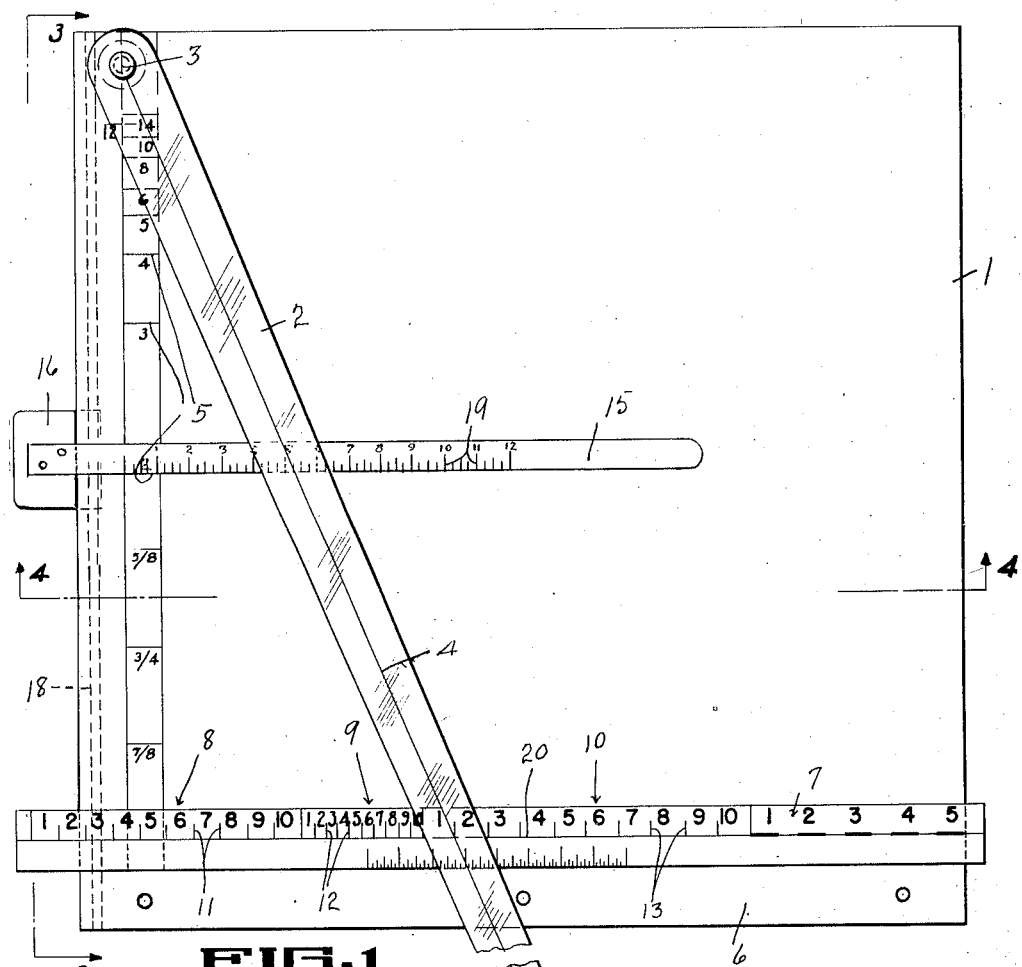
Fig. 1 is a plan view of the calculator.

In detail, the calculator, as illustrated, comprises a rectangular plate 1. An elongated arm 2, preferably of transparent material, is pivoted to plate 1 at the upper left hand corner of said plate as seen in Fig. 1. Pivot 3 so pivots arms 2 to said plate, and a straight line 4 may be inscribed on said arm longitudinally thereof from the center of pivot 3.

Extending vertically below pivot 3 is a straight column of spaced graduation marks 5 printed or inscribed on the upper side of plate 1. These are preferably numbered, each number indicating the fractional portion of a standard height letter, such as a ⅞ inch height letter from center to center. For example, the numeral "2" in said column would identify the graduation mark adjacent thereto with a letter ½ of a ⅞ inch height. This follows with the other numbers identifying the graduations 5.

Along the lower edge of the plate 1 is a ledge piece 6 that forms a ledge on its upper side for supporting an elongated scale member 7 for sliding of said member longitudinally thereof. This member 7 will be supported so as to extend across the lower end of the column of graduation 5 at right angles to said column.

Inscribed or printed on member 7 are several groups of graduations, the graduations in each group being similarly numbered from "1" up in succession. There are three groups indicated on member 7, the said groups being generally designated 8, 9, 10 from left to right as seen in Fig. 1.

The graduations 11 in group 8 are equally spaced apart and are successively numbered from "1" to "10" starting from the left. The space between these graduations indicates the width of the average letters other than "I," "M" or "W."

The graduations 12 in group 9 are equally spaced apart and designate the spaces required for the letter "I" or for spaces between words or periods and commas. Periods and commas generally being calculated as the width of an average letter plus the distance between an adjacent pair of graduations in group 12.

The graduations 13 in group 10 represent the spacing for the letters "M" and "W." These graduations are more widely spaced than either those in group 8, or in group 9.

Figure 2:
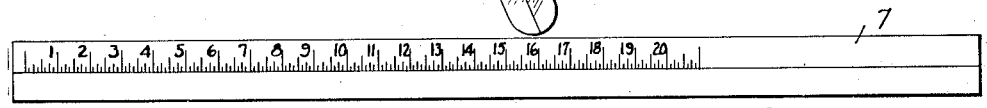
Fig. 2 is a plan view of the reverse side of the scale member that is seen along the lower edge of Fig. 1.
Figure 3:
Fig. 3 is an edge view of the device of Fig. 1 as seen from line 3—3 of Fig. 1.
Figure 4:
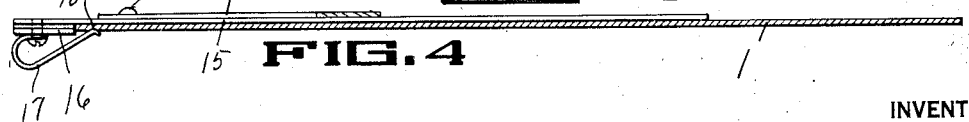
Fig. 4 is a sectional view taken through Fig. 1 along the line 4—4 of Fig. 1.

In groups 9, 10 the graduations therein are respectively numbered from "1" to "10" as explained for the graduations in group 8. Other space designations for certain space widths may be used as appears at the right hand end of member 7, and the reverse side may also be graduated for special work as seen in Fig. 2, but the essential graduations for practically every job are shown in groups 8, 9, 10.

A scale strip 15 overlies the plate 1 between pivot 3 and the scale member 7 and is parallel with the latter. This scale strip 15 and scale member 7 are adapted to be scanned by arm 2 upon swinging the latter across the plate about pivot 3, the said scale strip and scale member being below the arm 2.

Scale strip 15 has a head 16 that is adapted to slidably engage the left hand edge of plate 1 in the manner of the head of a T-square so that the strip will be parallel with member 7 at all times during sliding of said strip up and down the plate between pivot 3 and member 7, it being understood that the edge of the plate engaged by head 16 is at right angles to the length of strip 15 and member 7 and parallel with the vertical column of graduations 5 that are adjacent said edge.

A bow spring 17 secured to head 16 at one end is yieldably and frictionally in engagement with the side of plate 1 opposite the strip 15 and adjacent head 16 for frictionally holding the strip in any adjusted position between pivot 3 and member 7. A groove 18 may be provided in the side of plate 1 opposite strip 7 for holding one edge of said spring during sliding movement of the strip 15 up and down, thereby preventing the strip from being pulled off the plate in a direction longitudinally of said strip, and also preventing the strip from becoming dislodged.

The strip 15 carries main graduations 19 on its upper side that are identified by successive numbers starting from "1" at the left end portion. These graduations are equally spaced apart and indicate a linear measure, such as inches. The spaces between the main graduations are subdivided to indicate the fractional parts of the inch. The graduations 19 commence on a line extending through pivot 3 and parallel with the edge of the plate adjacent the column of graduations 5. Thus when arm 2 is vertical the line 4 thereon will extend through the first graduation 19. It is to be understood, of course, that the space between each adjacent pair of graduations 19 is not necessarily one inch. In fact the scale used is considerably reduced.

In operation, taking the name "WILLIAM MILLER" as an example, the operator may first decide the height letter he wishes to employ and then moves the scale strip 15 so its lower edge is aligned with the desired graduation 5. In the drawing, the scale strip is now aligned with the numeral "2" meaning that the height letter is ½ a standard height letter for which the device is designed to work, which standard height may be a ⅞ inch letter. The arm 1 is swung vertical so that line 4 extends through the left hand graduation 19 on scale strip 15. The scale member 7 is positioned so line 4 on arm 2 extends through the left hand graduation of group 8.

With the device in the above position the operator now counts the number of normal width letters, excluding the space and the "W," "I" 's, "M" 's, and the space. Thus there are found to be seven of these letters. The arm 2 is then swung to the right until line 4 extends through the intersection of a line 20 that is inscribed on member 7 and that extends normal to the graduation designated "7" in group 8.

The operator then counts the number of "I" 's and the space, which is found to be four. The scale member 7 is slid to the left until the line 4 extends through the intersection of the left hand graduation in group 9 and the line 20, and then the arm 2 is swung still further to the right until the line 4 extends through the intersecting point of graduation in group 9 numbered "4" and the line 20.

The operator next counts the "M" 's and "W" 's, finding that there are three of these. Member 7 is again shifted to the left until line 4 on arm 2 passes through the intersection between the left hand graduation in group 10 on scale member 7 and the line 20, after which the arm 2 is again swung still further to the right so that line 4 passes through the intersection between the graduation designated "3" in group 10 and the line 20.

It will now be found that the line 4 will pass through the lower end of the graduation on the scale strip 15 that is designated "6," which would indicate that the name "WILLIAM MILLER" would require a space 5¼ inches long at the height of the letter indicated by the graduation 5 that is aligned with the upper edge of the scale strip 15.

Obviously the numbers used to designate the graduations 5 may be directly given in the height of the letters. Also the graduations on strip 15 may be designated for the metric system, and there may be other groups indicated on member 7 for other spacings, such as where upper and lower case letters are used.

The reading point on scale member 7 or on scale strip 15 may be dots or crosses or any other type than merely the graduation lines and their points of intersection with either line 20 or with an edge of the strip. These are matters that can readily be changed to suit the particular desires of the users, and in no manner modify the invention inasmuch as the principle is the same and the manner of manipulation and results are the same.

The aforesaid detailed description, and the drawings, are not to be considered restrictive of the invention, but are merely illustrative thereof.

I claim:

A calculator of the character described comprising a plate provided along one edge with spaced graduations in a straight row respectively identified by indicia indicating different letter sizes, an elongated scale member slidably supported on said plate in a position extending at right angles to said row adjacent one end of the said row for movement longitudinally of said member, said scale member having a plurality of groups of corresponding numbers thereon disposed in a single row extending longitudinally of said row, the numbers in each group being uniformly spaced apart but the numbers in different groups being differently spaced from each other, and graduation marks adjacent each of the said numbers in said groups, a scale strip supported on said plate in a position extending across said row at right angles thereto for movement transversely of its length and longitudinally of said row, graduations on said strip disposed in a row extending longitudinally thereof and symbols identifying said latter graduations, an arm pivotally secured to said plate at the end of said first mentioned row of graduations opposite said scale member and extending across both said scale member and said scale strip for reading graduations on either said scale member or said scale strip at points of intersection by said arm.

WILLIAM A. WARTINEN.

REFERENCES CITED

The following references are of record in the file of this patent:

UNITED STATES PATENTS

| Number | Name | Date |
|---|---|---|
| 324,078 | Bulloch | Aug. 11, 1885 |
| 879,178 | Kelly | Feb. 18, 1908 |
| 1,553,683 | Furbish | Sept. 15, 1925 |
| 1,560,599 | Moler | Nov. 10, 1925 |
| 2,300,401 | Basler et al. | Nov. 3, 1942 |